United States Patent

Ohmi et al.

[11] Patent Number: 5,482,332
[45] Date of Patent: Jan. 9, 1996

[54] PIPE JOINT

[75] Inventors: Tadahiro Ohmi, Sendai; Tsutomu Shinohara, Osaka; Michio Yamaji, Osaka; Nobukazu Ikeda, Osaka; Kenji Yamamoto, Osaka, all of Japan

[73] Assignee: Fujikin Incorporated, Osaka, Japan

[21] Appl. No.: 329,963

[22] Filed: Oct. 27, 1994

[30] Foreign Application Priority Data

Oct. 28, 1993 [JP] Japan ................................. 5-270813

[51] Int. Cl.$^6$ ............................................. F16L 25/00
[52] U.S. Cl. ........................... 285/328; 285/379; 285/917
[58] Field of Search ............................ 285/917, 328, 285/379

[56] References Cited

U.S. PATENT DOCUMENTS

| | | | |
|---|---|---|---|
| 4,650,227 | 3/1987 | Babuda et al. ............ | 285/917 X |
| 4,854,597 | 8/1989 | Leigh . | |
| 5,087,085 | 2/1992 | McGarvey ..................... | 285/328 |

FOREIGN PATENT DOCUMENTS

| | | |
|---|---|---|
| 0571641 | 5/1992 | European Pat. Off. . |
| 0567924 | 4/1993 | European Pat. Off. . |

*Primary Examiner*—Dave W. Arola
*Attorney, Agent, or Firm*—Armstrong, Westerman, Hattori, McLeland & Naughton

[57] ABSTRACT

A pair of tubular joint members each have a gasket holding annular protuberance on an abutting end face thereof. The protuberance has an inner peripheral surface continuous with the inner peripheral surface of the joint member, and a sealing face adapted to intimately contact an end face of of a gasket at a position radially outward from the inner peripheral surface thereof. The sealing face is most protuberant at a position radially outward from an inner edge thereof. When the most protuberant end of the sealing face comes into contact with the gasket end face, a clearance is formed between the portion of the sealing face radially inward from the protuberant end and the radially inward portion of the gasket end face. The clearance is eliminated by the deformation of the gasket when the pipe joint is tightened up.

5 Claims, 4 Drawing Sheets

5,482,332

PIPE JOINT

BACKGROUND OF THE INVENTION

Pipe joints are already known which comprise a pair of tubular joint members each having a gasket holding annular protuberance on an abutting end face thereof, an annular gasket interposed between the abutting end faces of the respective joint members, and a nut for joining the joint members together. The joint members, annular protuberances and gasket are equal in inside diameter, and each annular protuberance is adapted to contact the inner edge portion of the gasket over the entire circumference thereof.

With reference to FIGS. 6 and 7 showing the conventional pipe joint, indicated at 42 is the joint member, at 44 the gasket holding annular protuberance and at 45 the annular gasket.

With the conventional pipe joint described, each annular protuberance 44 is adapted to come into contact with the inner peripheral edge portion of the gasket 45 over the entire circumference thereof to make the protuberance 44 flush with the gasket 45 when the nut has been tightened up and to eliminate any liquid trapping recess from the pipe joint.

In the case of the conventional pipe joint described, the force acting on the gasket holding annular protuberance 44 when the nut is tightened has not only an axial (i.e., rightward in FIG. 6) component but also an inward (downward in FIG. 6) component as seen in FIG. 6, so that the protuberance 44 deforms inward. On the other hand, the gasket 45 deforms most markedly at the inner edge portion thereof with which each protuberance 44 comes into contact first. Consequently, there arises the problem that the protuberance 45 and the inner edge portion of the gasket 44 become separated, forming a liquid trapping annular recess S between the protuberance 44 and the gasket 45 when the pipe joint is tightened up as shown in FIG. 7.

SUMMARY OF THE INVENTION

An object of he present invention is to eliminate a recess due to the deformation of the gasket and gasket holding annular protuberance and to provide a pipe joint wherein no liquid trapping recess is present when the joint is tightened up.

The present invention provides a pipe joint comprising a pair of tubular joint members each having a gasket holding annular protuberance on an abutting end face thereof, an annular gasket interposed between the abutting end faces of the respective joint members, and threaded means for joining the joint members together, the annular protuberance having an inner peripheral surface continuous with the inner peripheral surface of the joint member, and a sealing face adapted to intimately contact an end face of the gasket at a position radially outward from the inner peripheral surface thereof. The pipe joint is characterized in that the sealing face is most protuberant at a position radially outward from an inner edge thereof, and that when the most protuberant end of the sealing face comes into contact with the end face of the gasket, a clearance is formed between the portion of the sealing face radially inward from the most protuberant end and the radially inward portion of the gasket end face, the gasket being deformable to eliminate the clearance when the pipe joint is tightened up.

When the pipe joint of the invention is tightened, the most protuberant end P of the sealing face 34b of the gasket holding annular protuberance 34 comes into contact with the end face of the gasket 20 as shown in FIG. 4. At this time, a clearance G1 is formed between the portion of the sealing face 34b radially inward from the most protuberant end P and the radially inward portion of the gasket 20. The force exerted on the sealing face 34b when the nut is further tightened acts slightly outward from the axial direction at the portion radially inward from the protuberant end P, and slightly inward from the axial direction at the portion radially outward from the protuberant end P. The resultant force on the annular protuberance 34 acts approximately in the axial direction (rightward in FIG. 4). Consequently, the annular protuberance 34 recesses the gasket 20 most greatly at the radially inward portion thereof with which the protuberant end P comes into contact first, almost without deforming radially inward. When the pipe joint is tightened up, the inner periphery 34a of the protuberance 34 becomes substantially flush with the inner periphery of the gasket 20 with the clearance G1 eliminated as seen in FIG. 5.

With no liquid trapping recess present, it is unlikely that the fluid flowing through the pipe will be mixed with a fluid portion remaining in a recess to result in an impaired purity or to produce a reaction product. The pipe joint is therefore usable for piping which requires a high degree of cleanliness.

DESCRIPTION OF THE PREFERRED EMBODIMENT

Figure 1:
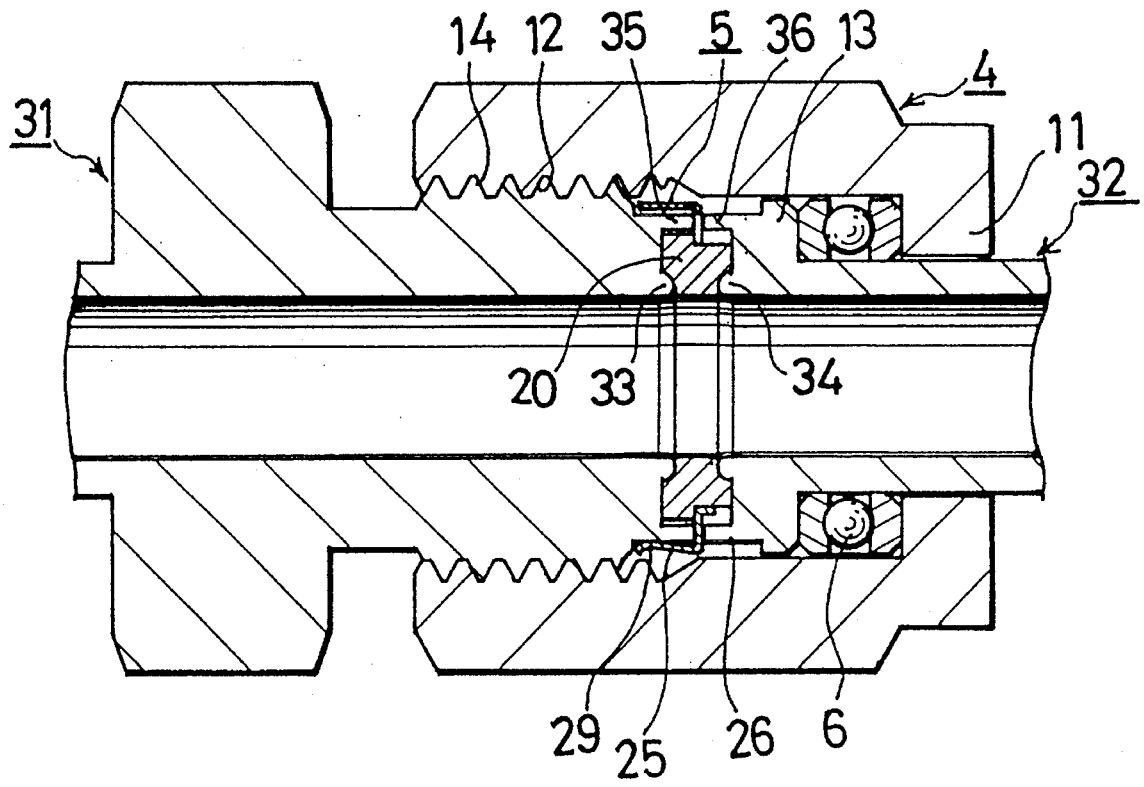
FIG. 1 is a view in longitudinal section of a pipe joint of the invention.
Figure 2:
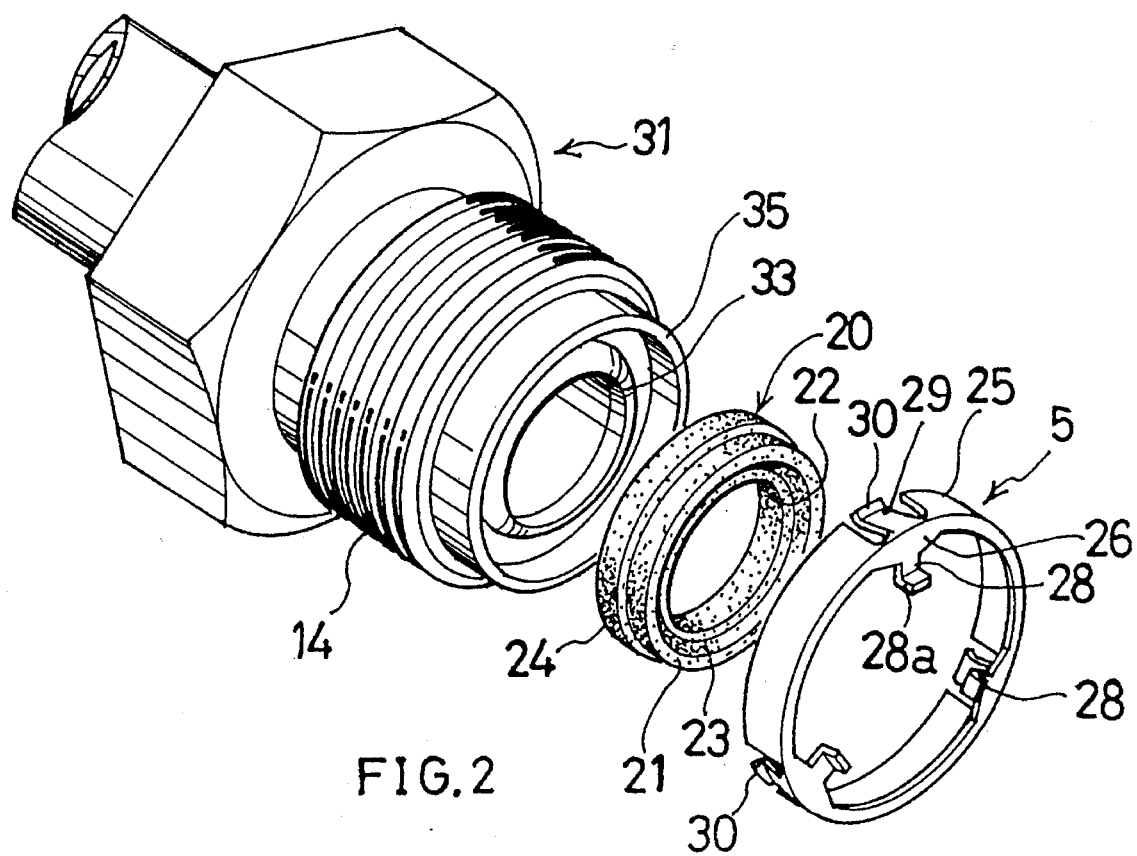
FIG. 2 is a fragmentary exploded perspective view of FIG. 1.
Figure 3:
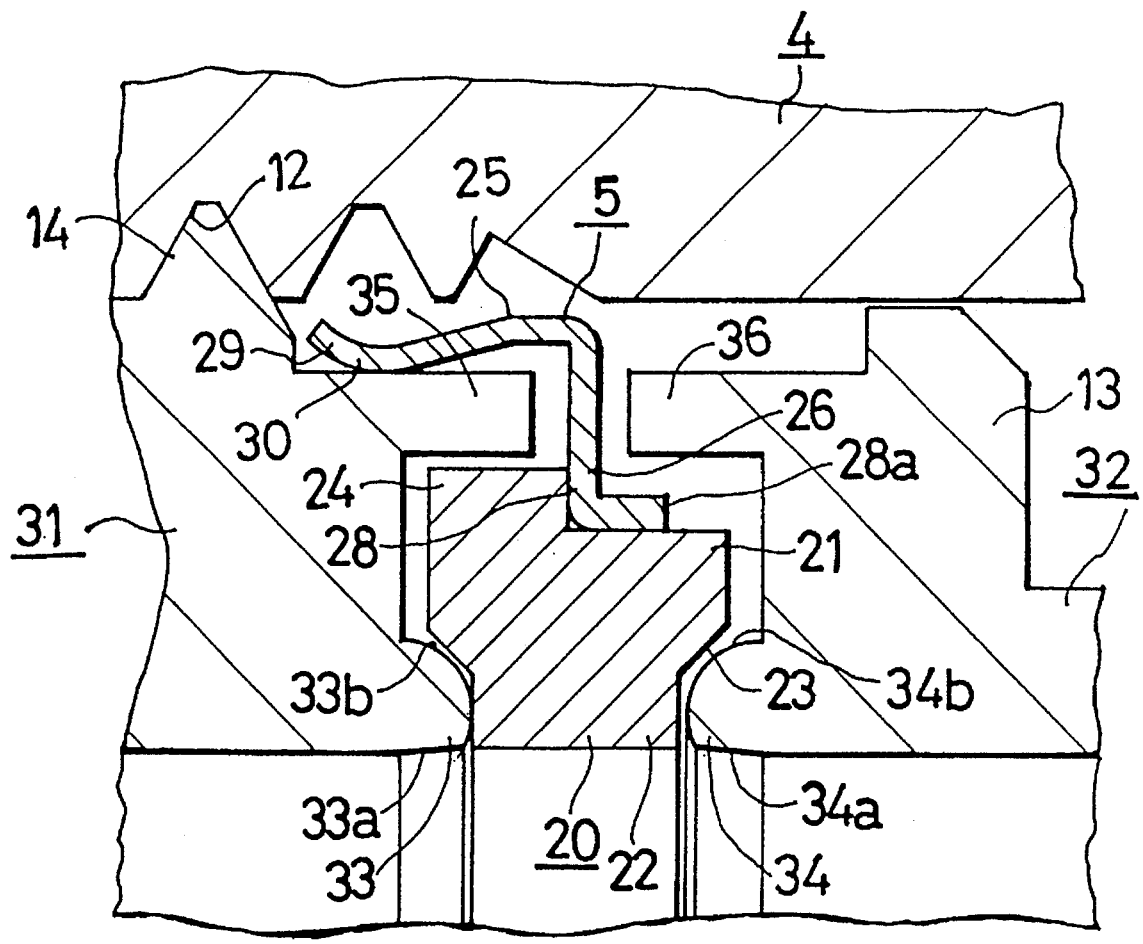
FIG. 3 is a fragmentary enlarged view in section of FIG. 1.
Figure 4:
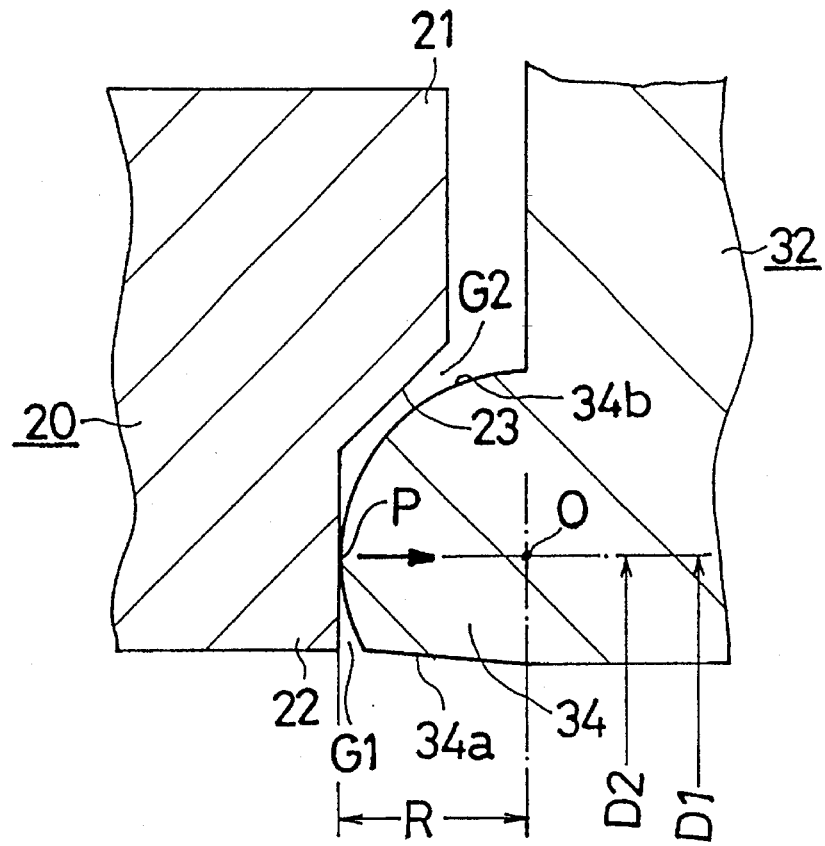
FIG. 4 is a fragmentary enlarged view in section showing the pipe joint of FIG. 1 while it is being tightened.
Figure 5:
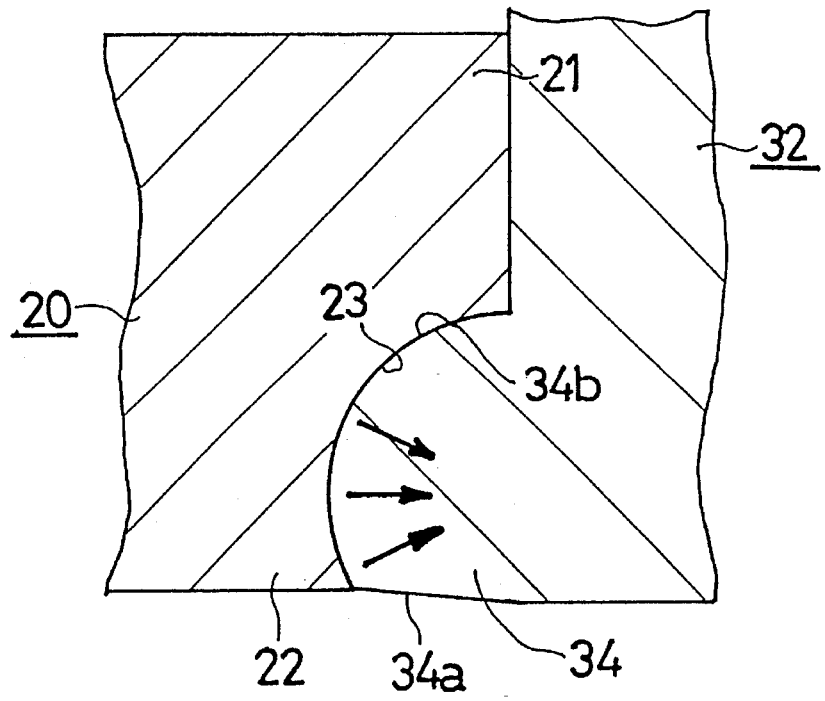
FIG. 5 is a fragmentary enlarged view in section showing the pipe joint of FIG. 1 as tightened up.
Figure 6:
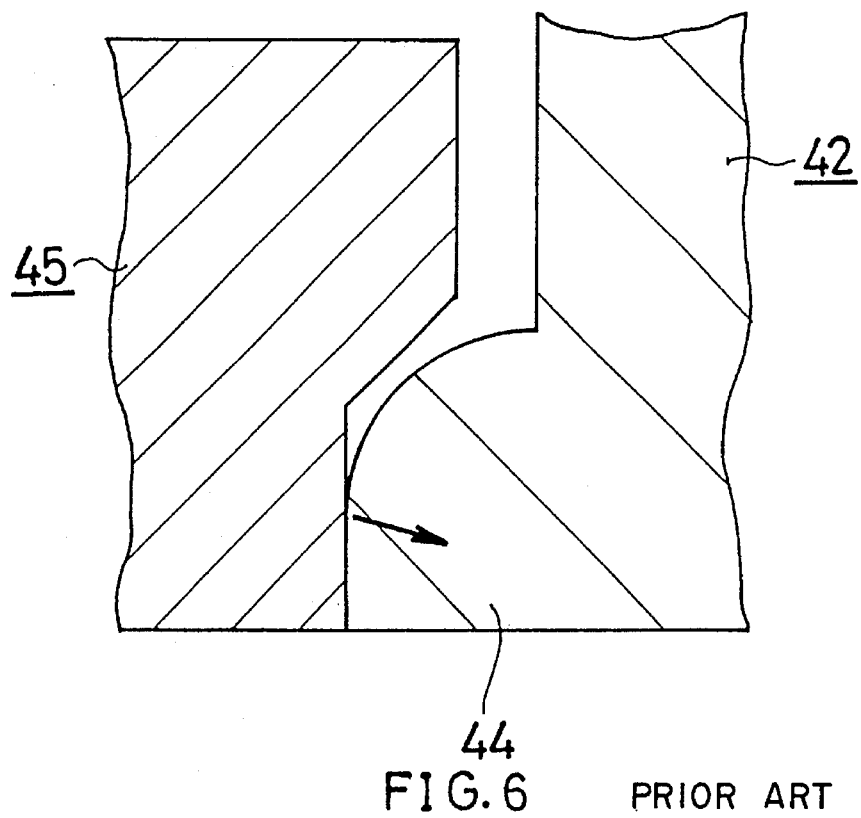
FIG. 6 is a fragmentary enlarged view in section showing a conventional pipe joint while it is being tightened.
Figure 7:
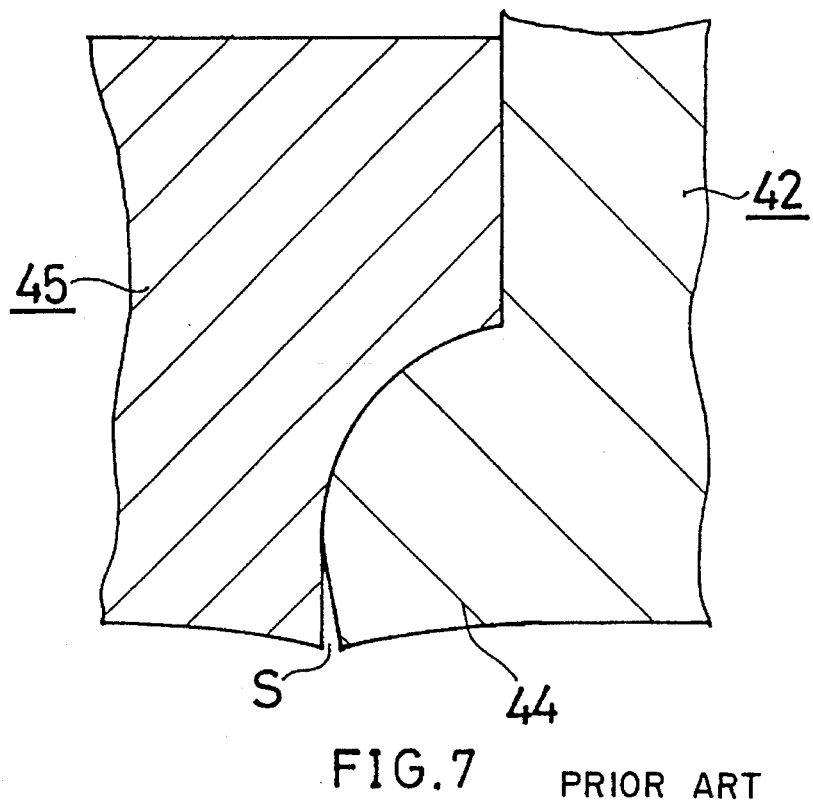
FIG. 7 is a fragmentary enlarged view in section showing the conventional pipe joint as tightened up.

An embodiment of the invention will be described below with reference to the drawings. In the following description, the terms "right" and "left" are used based on FIG. 1.

With reference to FIGS. 1 to 5, the pipe joint shown comprises a first tubular joint member 31, a second tubular joint member 32, an annular gasket 20 interposed between the right end face of the first joint member 31 and the left end face of the second joint member 32, and a retainer 5 holding the gasket 20 and held by the first joint member 31. The second joint member 32 is fastened to the first joint member 31 by a nut 4 provided on the member 32 and screwed onto the first member 31. The abutting end faces of the respective joint members 31, 32 are formed, each on its inner peripheral portion, with gasket holding annular protuberances 33, 34, respectively, and have overtightening preventing annular projections 35, 36, respectively, at the outer peripheral portion of each member.

The gasket 20 comprises an inner annular portion 22 equal to the joint members 31, 32 in inside diameter, an outer annular portion 21 having opposite side faces projecting outward beyond the respective opposite side faces of the inner annular portion 22 axially thereof (toward right and left), and a tapered portion 23 between the outer and inner annular portions 21, 22. The annular protuberances 33, 34 are adapted to bear on the opposite sides faces of the inner annular portion 22 and the tapered portion 23. The amount of projection of each side face of the outer annular portion 21 beyond the corresponding side face of the inner annular portion 22 is slightly greater than the height of the protuberance 33 or 34 minus an amount by which the joint member 31 or 32 is axially moved relative to the gasket 20 when the pipe joint is properly tightened up. The outer annular portion 21 is provided on its outer periphery with a slipping-off preventing portion 24 in the form of an outer flange. Even when the gasket 20 is formed against the retainer 5, this portion 24 prevents the gasket 20 from slipping off the retainer 5 from the right side thereof, making it easy for the retainer 5 to hold the gasket 20 thereto or for the joint member 31 or 32 to hold the retainer 5 thereto. The gasket 20 is made of nickel, and when desired, plated with silver. When suitable, authentic stainless steel, copper, aluminum alloy or the like is used for making the gasket 20.

The retainer 5, which is integrally made of a stainless steel plate, comprises a ring portion 25, a gasket holding portion 26 having three claws 28 inwardly projecting from the right end of the ring portion 25 and adapted to hold the outer periphery of the gasket 20, and a joint member holding portion 29 engageable with the right end of the first joint member 31. The three claws 28 have slight resiliency. Each of the claws 28 has a rightwardly bent outer end to provide a bent lug 28a having slight resiliency. The gasket 20 is fitted to the inside of the claws 28 with the bent lugs 28a in intimate contact with the gasket 20, whereby the gasket 20 in the retainer 5 is prevented from moving radially and axially thereof. At the position where each of the three claws 28 is formed, the ring portion 25 has a pair of axial cutouts to provide a holding pawl 30. The three pawls 30 thus formed provide the joint member holding portion 29. The three holding pawls 30 resiliently hold the right end outer surface of the first joint member 31, whereby the retainer 5 is held by the first joint member 31.

The nut 4 has an inner flange 11 formed at its right end and fitting around the second joint member 32. The nut 4 has at its left end an internally threaded portion 12, which is screwed on an externally threaded right portion of the first joint member 31. The second joint member 32 has an outer flange 13 on the outer periphery of its left end. A thrust ball bearing 6 is interposed between the outer flange 13 and the inner flange 11 of the nut 4 for preventing the joint member 32 from rotating with the nut 4.

the gasket holding annular protuberances 33, 34 each have an inner peripheral surface 33a (34a) further extending forward beyond the inner peripheral surface of the joint member 31 (32), and a sealing face 33b (34b) adapted to intimately contact the end face of the gasket 20 opposed thereto at a position radially outward from the inner peripheral surface 33a (34a). In cross section, the sealing face 33b (34b) is in the form of a circular arc larger than a quarter of the corresponding circle. The circular arc has a center O at a position having a diameter larger than the inside diameter of the joint member 31 (32), whereby the sealing face 33b (34b) is made most protuberant at a position radially outward from the inner edge thereof. As the nut 4 is tightened, the most protuberant end P of the sealing face 33b (34b) comes into contact with the gasket 20 first. At this time, a clearance G1 is formed between the portion of the sealing face 33b (34b) radially inwardly from the protuberant end P and the radially inward portion of end face of the gasket 20 opposed thereto. Upon the protuberant end P coming into contact with the gasket 20, a small clearance G2 is formed also between the tapered portion 23 of the gasket 20 and the portion of the sealing ace 33b (34b) which is opposed to the tapered portion 23 (see FIG. 4).

The overtightening preventing annular projections 35, 36 are projected rightward and leftward (i.e., toward each other) beyond the protuberances 33, 34, respectively, and are adapted to press the retainer 5 on opposite sides thereof when the nut 4 is to be tightened up more than is properly. These projections 35, 36 protect the protuberances 33, 34 of the joint members 31, 32 before assembling, whereby protuberances 33, 34 are precluded from damage that would seriously influence the sealing properties.

The force exerted on each of the sealing faces 33b, 34b when the nut 4 is tightened acts slightly outward from the axial direction at the portion radially inward from the most protuberant end P, and slightly inward from the axial direction at the portion radially outward from the protuberant end P. The resultant force on the annular protuberance 34 acts approximately in the axial direction (rightward in FIG. 4). As the nut 4 is progressively tightened, the protuberance 34 undergoes little or no inward deformation but recesses the gasket 20 most greatly at the portion thereof with which the protuberant end P comes into contact first to diminish the clearance G1. When properly tightened up, the nut 4 eliminates the clearance G1 and deforms the protuberances 33, 34 so as to reduce the tapered angle of their inner peripheral surfaces 33a, 34a, rendering the inner peripheries of the joint members 31, 32 substantially flush with the inner periphery of the gasket 20. Thus, no liquid trapping recess remains between the gasket 20 and the protuberances 33, 34 when the pipe joint is tightened up.

With the foregoing embodiment, the gasket 20 and the annular protuberances 33, 34 are so dimensioned as to eliminate the clearances G1, G2 between the gasket 20 and the protuberances 33, 34 when the tightening torque reaches the proper value.

For example, the gasket holding annular protuberances 33, 34 have the following dimensions in cross section. The straight portion has a taper angle of 5 degrees, the height of the protuberance is 0.5 mm, the radius R of the circular arc is 0.5 mm, and the circular arc has its center O at a portion having a diameter which is 0.3 mm larger than the inside diameter D1 of the joint members 31, 32. The diameter 2R of the circular arc is preferably 0.8 to 1.2 mm. The difference between the diameter D2 of the center of the circular arc and the inside diameter D1 of the joint members 31, 32 is preferably 30 to 60% of the diameter of the circular arc, more preferably 20 to 40% thereof.

With the above embodiment, the inner peripheral surfaces 33a, 34a of the protuberances, 33, 34 are each in the form of a tapered surface flaring toward the gasket, whereas these surfaces may be made completely flush with the inner peripheries of the joint members 31, 32 instead of tapering. Furthermore, the sealing faces 33b, 34b of the protuberances 33, 34 may locally include a straight portion, while the portion of each sealing face in the vicinity of the most protuberant end P may be straight in section instead of being circular arc.

What is claimed is:

1. A pipe joint comprising a pair of tubular joint members each having a gasket holding annular protuberance on an abutting end face thereof, an annular gasket interposed between the abutting end faces of the respective joint members, and threaded means for joining the joint members together, the annular protuberance having an inner peripheral surface continuous with the inner peripheral surface of the joint member, and a sealing face adapted to intimately contact an end face of the gasket at a position radially outward from the inner peripheral surface thereof, the pipe joint being characterized in that the sealing face is most protuberant at a position radially outward from an inner edge thereof, and that when the most protuberant end of the sealing face comes into contact with the end face of the gasket, a clearance is formed between the portion of the sealing face radially inward from the most protuberant end and the radially inward portion of the gasket end face, the gasket deforming to eliminate the clearance when the pipe joint is tightened up.

2. A pipe joint as defined in claim 1 wherein the sealing face has a circular-arc cross section larger than a quarter of the corresponding circle, and the circular arc has a center at a position having a diameter larger than the inside diameter of the joint member.

3. A pipe joint as defined in claim 2 wherein the circular arc has a diameter of 0.8 to 1.2 mm, and the difference between the diameter of the center of the circular arc and the inside diameter of the joint member is 30 to 60% of the diameter of the circular arc.

4. A pipe joint comprising a pair of tubular joint members each having a gasket holding annular protuberance on an abutting end face thereof, an annular gasket interposed between the abutting end faces of the respective joint members, and threaded means for joining the joint members together, the gasket having a central axis and an end face portion extending substantially perpendicular with respect to said gasket axis, the annular protuberance having an inner peripheral surface continuous with the inner peripheral surface of the joint member, and a sealing ace adapted to intimately contact an end face of the gasket at a portion radially outward from the inner peripheral surface thereof, the pipe joint being characterized in that the sealing face of said protuberance is most protuberant at a position radially outward from an inner edge thereof, and that when said protuberance first engages said gasket end face the most protuberant end of the sealing face comes into contact with the perpendicular end face portion of the gasket, whereby a clearance is formed between the portion of the sealing face radially inward from the most protuberant end and the radially inward portion of the gasket face, the gasket deforming to eliminate the clearance when the pipe joint is tightened up and the gasket axially compressed.

5. A pipe joint as defined in claim 4 in which, when said protuberance first engages said gasket end face, the most protuberant end of the sealing face comes into contact with the perpendicular end face portion of the gasket and forms a clearance between the portion of the sealing face radially outward from the most protuberant end and the radially outward portion of the gasket surface.

* * * * *